Figure 1:
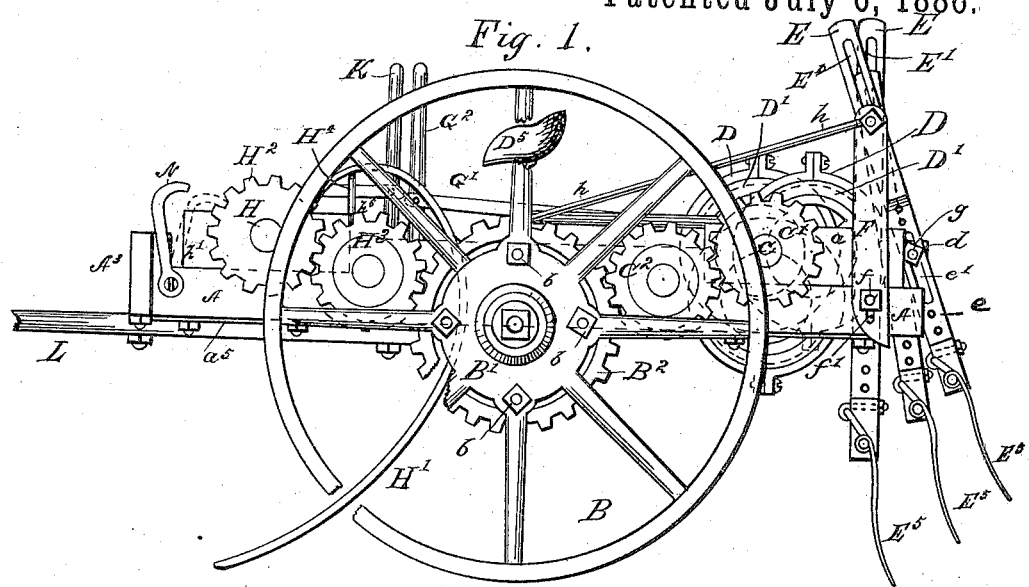

(No Model.) 2 Sheets—Sheet 1.

A. G. BARTON.
TEDDER.

No. 344,803. Patented July 6, 1886.

WITNESSES
John C. Miller
Percy White

INVENTOR
Albert G. Barton
By G. W. Balloch,
Attorney.

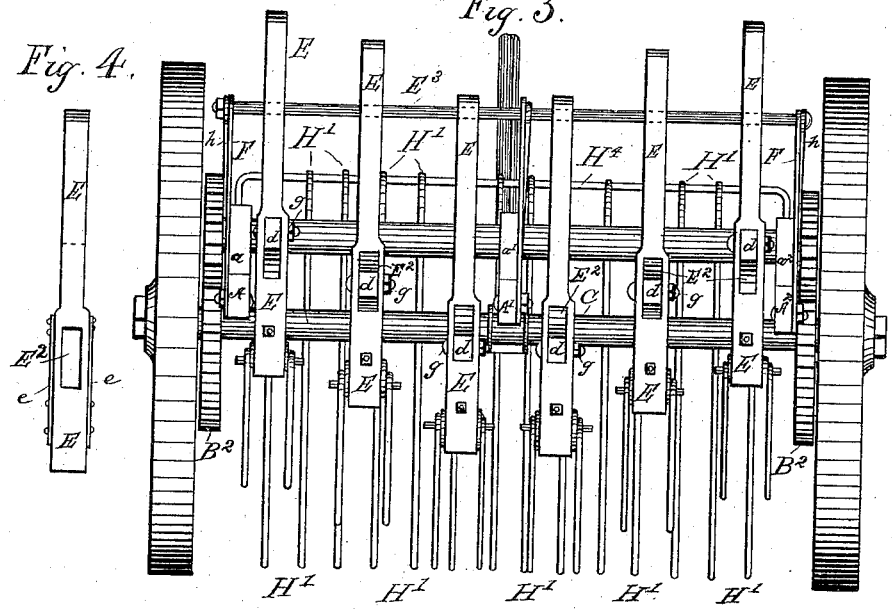
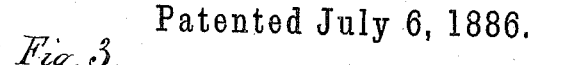
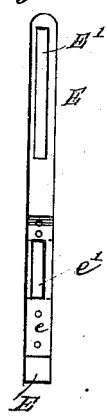
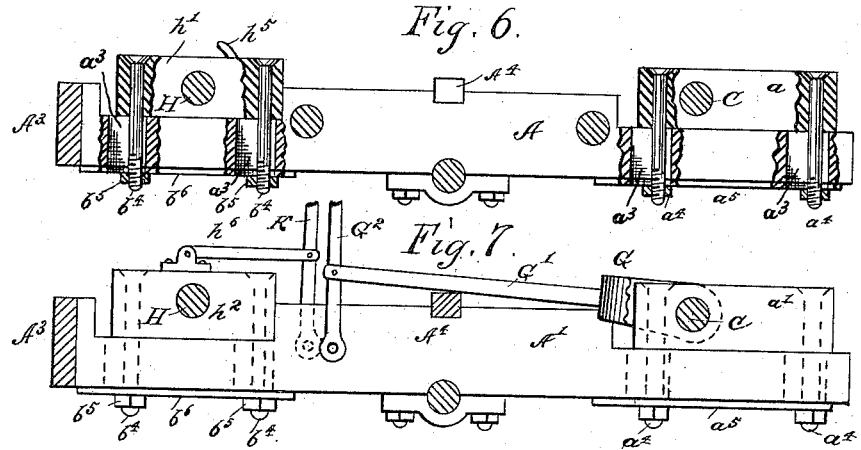
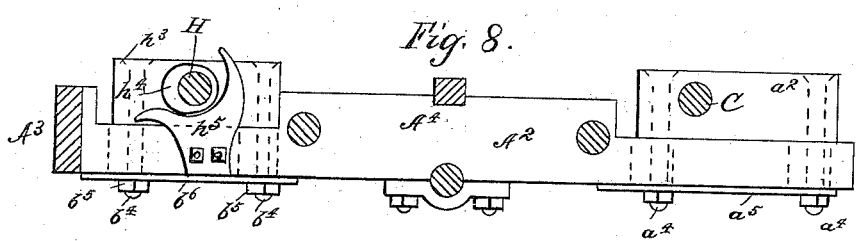

UNITED STATES PATENT OFFICE.

ALBERT G. BARTON, OF CONSTANTINE, MICHIGAN.

TEDDER.

SPECIFICATION forming part of Letters Patent No. 344,803, dated July 6, 1886.

Application filed June 26, 1885. Serial No. 169,824. (No model.)

*To all whom it may concern:*

Be it known that I, ALBERT G. BARTON, of Constantine, in the county of St. Joseph and State of Michigan, have invented a new and useful Improvement in Hay-Tedders; and I do hereby declare that the following is a full and exact description of the same, reference being had to the accompanying drawings, and to the letters of reference marked thereon.

The objects of this improvement are, first, a combined hay tedder and rake, in which the tedder-and-rake mechanism may be adjusted in or out of gear with the same operating means, and thus adapted for either purpose, as occasion may require; secondly, to obtain such movement for the tedder-arms as will stir the hay more efficiently than is otherwise practicable; and, thirdly, to so construct and connect the tedder-arms that they may be given a greater or less throw for the purpose of stirring the hay more or less, and also adjust themselves automatically to any unevenness in the ground, or to stones or other objects frequently to be met on the surface over which such mechanism must be used. These results are attained by the means illustrated in the drawings herewith filed as part hereof, in which the same letters of reference denote the same parts in the different views.

Figure 2:
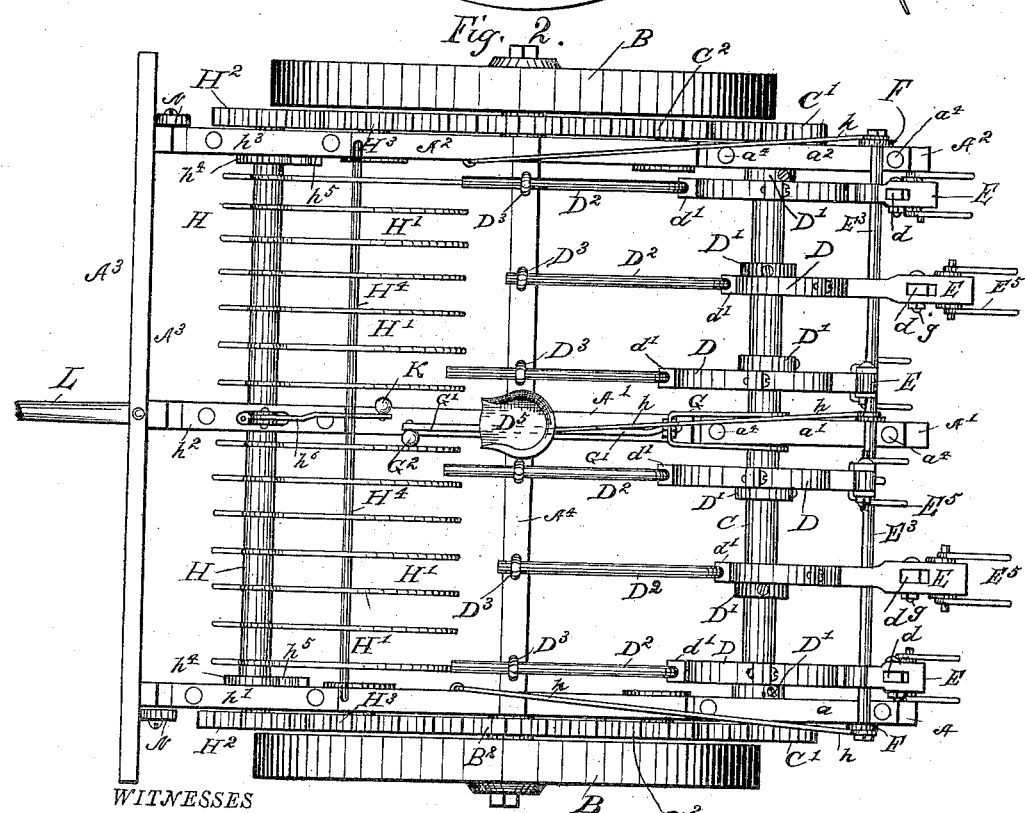

Figure 1 is a side elevation with parts broken away, representing a combined hay tedder and rake embodying the features of my improvement. Fig. 2 is a plan view. Fig. 3 is a rear elevation. Figs. 4 and 5 represent front and side views of the same detached part. Figs. 6, 7, and 8 are longitudinal sections taken through different parts of the supporting-frame.

A A' A$^2$ A$^3$ A$^4$ is the frame-work which supports the working parts.

B B are the transporting-wheels, the hubs of which are laterally extended, as shown at B', for the purpose of connecting thereto the driving-gear B$^2$, which is bolted to the hub-extensions B', as shown at $b$.

C is a shaft having bearings in blocks $a$ $a'$ $a^2$, which are supported by and arranged to slide on frame-pieces A A' A$^2$, which are cut away on their tops for the reception of the blocks $a$ $a'$ $a^2$, and provided with slots $a^3$ $a^3$, for the passage of the bolts $a^4$ $a^4$, by means of which said blocks are secured to the frame-pieces A A' A$^2$, on which they are arranged to slide, as and for a purpose hereinafter set forth.

$a^5$ are thin metal plates secured to the lower edges of the frame-pieces A A' A$^2$, to prevent wear of the same by friction from the nuts on the bolts $a^4$ $a^4$.

C' C' are pinions fixed to the shaft C, for the purpose of meshing with a pinion, C$^2$, on each of the frame-pieces A A$^2$, and connecting the shaft C with the motion of the transporting-wheels through the gearing B$^2$ B$^2$.

D' are eccentrics of uniform size, suitably secured to the shaft C to have relatively consecutive motion with each other.

D D are the eccentric yokes, having rearward projections, as shown at $d$ $d$, Figs. 1 and 3, and forward projections, as shown at $d'$ $d'$ in Fig. 2.

D$^2$ D$^2$ are rods secured to the eccentric extensions $d'$, substantially in the manner shown, and arranged to slide in eyes D$^3$, affixed to the transverse frame-piece A$^4$, as fully shown in Fig. 2.

E E are tedder-arms provided at their upper ends with slots E', and intermediately of their ends with slots E$^2$, for the reception of the eccentric-yoke projections $d$, and transverse slots $e'$, (shown in Figs. 1 and 5,) for the reception of bolts $g$, which pass through the eccentric-yoke projections $d$, and form the connections between the tedder-arms E and the eccentric yokes D.

F F are standards secured to the outer frame-pieces, A A$^2$, by bolts $f$, which pass through slots $f'$ in the lower parts of the standards F, by reason of which slots $f'$ the standards are vertically adjustable, for a purpose hereinafter explained.

E$^3$ is a rod supported by and connecting through the slots E' of the tedder-arms E with the standards F F.

G is a yoke-plate provided with perforations which fits the shaft C, and connects therewith on each side of the sliding block $a'$, and is also connected through a rod, G', with a lever, G$^2$, pivoted to the frame-piece A', as shown in Fig. 7.

$h$ $h$ are brace-rods connecting the side bars of the supporting-frame to the standards F F, for the purpose of bracing the position of the rod E$^3$ against the motion of the tedder-arms E.

H is a rake-shaft provided at its outer ends with pinions H², arranged to mesh with pinions H³, suitably mounted on the frame-pieces A² A, and transmitting motion to the rake-shaft H from the transporting-wheels B, through the gearing B².

H' are the rake-teeth, secured by any suitable means to the shaft H, which has its bearings in blocks $h'\ h^2\ h^3$, secured to the frame-pieces A A' A² by bolts and nuts $b^4\ b^5$, as fully shown in Fig. 6, and arranged to slide on their connecting frame-pieces, for a purpose hereinafter set forth.

K is a lever pivoted to the frame-piece A' and connected by a bar, $h^6$, with the central sliding block, $h^2$, substantially as shown in Fig. 7.

$h^4\ h^4$ are eccentrics, affixed by any suitable means to the rake-shaft H, immediately adjacent to the sliding shaft-bearings $h'\ h^3$, and engage with $h^5\ h^5$, secured to the corresponding frame-pieces, A A².

$b^6\ b^6$ are thin metal plates secured to the lower edges of the frame-pieces, as shown, to prevent wear of the same by friction of the nuts $b^5$ and the bolts $b^4$.

L is the tongue or draft-pole for the machine, suitably secured to either the upper or lower edge of the central frame-piece, A', as may be deemed advisable.

D⁵ is the driver's seat.

N N represent pawls pivoted to the outer frame-pieces, A A², in position to engage with the rake-shaft gearing H² and hold the rake-teeth in suspension when the rake is not in use.

The tedder-arms E are provided at their connections with the eccentrics D with thin metal plates $e$, for the purpose of strengthening the same and preventing wear of the parts, by the bolts $g\ g$, which pass through the transverse slots $e'$, (shown in Figs. 1 and 5,) and secure the tedder-arms to the extensions $d$ of the eccentric yokes D.

H⁴ is a rod transversely secured to the supporting-frame, for the purpose of engaging with the rake-teeth and holding them at proper distance from the ground.

E⁵ E⁵ represent tedder-forks of ordinary construction, secured to the tedder-arms in the ordinary manner.

The sliding blocks $a\ a'\ a^2$, forming the bearings for the eccentric-shaft C, may be adjusted by means of the yoke-plate G, rod G', and lever G², and the shaft C thus put in or out of gear with the driving-gear B².

By reason of the slots E' in the upper part of the tedder-arms, and the slots $e'$, through which the arms are connected with the eccentrics, the arms will automatically adjust themselves to any unevenness in the ground, or other ordinary objects frequently to be met on its surface. By raising or lowering the standards F F, which support the rod E³, the arms E will be given a greater or less throw. By operating the lever K the sliding blocks $h'\ h^2\ h^3$ may be adjusted, and the rake-shaft having its bearings therein may be put in gear with the drive-gear B² through the pinions H² H³. As the shaft H is turned, the eccentrics $h^4\ h^4$ will engage the curved plates $h^5$, and the rake mechanism will thus be automatically thrown out of gear, and will drop into position for action on the hay. The eccentrics $h^4\ h^4$ may be dispensed with for this purpose, and the adjustment may be made by means of the lever only, and the same may be arranged to be operated by the feet of the driver from the seat D⁵.

Having explained the construction and operation of my improvement, what I claim as new, and desire to secure by Letters Patent, is—

1. In a hay-tedder, the tedder-arms, slotted, as shown and described, the adjustable geared shaft provided with eccentrics having yokes affixed to the tedder-arms, as specified, the adjustable standards, and the rod connecting the same through slots in the tedder-arms, substantially as and for the purpose set forth.

2. In a hay-tedder, the combination of the yoke-plate G, bar G', lever G², geared shaft C, the supporting-frame provided with sliding bearings for the shaft C, and with pinions C², and the geared transporting-wheels B B, substantially as and for the purpose set forth.

In testimony whereof I affix my signature in presence of two witnesses.

ALBERT G. BARTON.

Witnesses:
J. J. STROHM,
JOHN G. SCHURTZ.